United States Patent [19]

Corsi et al.

[11] Patent Number: 4,615,939

[45] Date of Patent: Oct. 7, 1986

[54] BIAXIALLY DRAWN, COMPOSITE POLYESTER FILM SUBSTRATES

[75] Inventors: Philippe Corsi; Marcel Eyraud, both of Lyons, France

[73] Assignee: Rhone-Poulenc Films, Courbevoie, France

[21] Appl. No.: 630,574

[22] Filed: Jul. 13, 1984

[30] Foreign Application Priority Data

Jul. 13, 1983 [FR] France ................................. 83 11931

[51] Int. Cl.⁴ ........................... B05D 5/12; B32B 5/16
[52] U.S. Cl. .................................... 428/323; 427/127; 427/128; 428/172; 428/325; 428/328; 428/339; 428/694; 428/900
[58] Field of Search ............... 428/172, 323, 325, 339, 428/328, 694, 900; 427/127, 128

[56] References Cited

U.S. PATENT DOCUMENTS 3,950,206  4/1976  Adachi et al. ....................... 428/480
4,348,446  9/1982  Mitsuishi et al. .................... 428/694

FOREIGN PATENT DOCUMENTS 035835  9/1981  European Pat. Off. .

*Primary Examiner*—Jacob Ziegler
*Attorney, Agent, or Firm*—Burns, Doane, Swecker & Mathis

[57] ABSTRACT

Biaxially drawn, advantageously filled multilayer polyester film substrates, well adapted for the manufacture of magnetic recording tapes, are comprised of a composite of at least two adjacent layers of biaxially stretched thermoplastic polyester film, at least one of the face surfaces thereof having a roughness defined by a plurality of dome and peak protuberances extending therefrom, said domes being present in a concentration of at least 5 per $mm^2$ and having heights of at least 9/100 of one micron, the ratio of the height of such dome protuberances to the diameter of the base thereof being less than 1/100, and the ratio of the height of such peak protuberances to the diameter of the base thereof being at least 1/100.

19 Claims, No Drawings

BIAXIALLY DRAWN, COMPOSITE POLYESTER FILM SUBSTRATES

BACKGROUND OF THE INVENTION

1. Field of the Invention

The present invention relates to novel composite polyester films and the production thereof, and, more especially, to novel biaxially drawn, thin composite polyester films having on at least one outer face surface thereof a novel and original roughness comprising protuberances in the shape of "domes" and "peaks" which makes it possible to obtain a highly satisfactory characteristics (ease of winding at high speed or slip) and abrasion phenomena (resistance to white powder formation). The subject novel films are well adapted for the manufacture of magnetic recording tapes having good electromagnetic properties.

2. Description of the Prior Art

Already known to this art are thin composite polyester films capable of being used, in particular, for the manufacture of audio or video recording tapes and incorporating a transparent layer, typically unfilled or, if appropriate, very lightly filled, and at least one outer layer incorporating an additive consisting of a fine filler and making it possible to confer the slip properties which are required for good machinability.

Such biaxially drawn composite films are, for example, described in British Pat. No. 1,397,653 to La Cellophane, and include, as a core element, a layer of transparent (unfilled) polyester, and on the outside at least one less transparent and more slippery polyester layer containing solid particles of a size below 2 microns and originating from the catalyst residue.

With such composite films it is not an easy matter to adjust the roughness to the intended application by modifying the microrelief and hence the size, the number and the distribution of the protuberances. It also is not an easy matter to control the difference in roughness between the two outer face surfaces of the composite film.

It is difficult, furthermore, to altogether avoid the presence of peaks whose size is too great relative to all of the other protuberances (it is well known that this presence is undesirable, since it implies, in fact, information losses and hence faults such as "drop out" in the case of video magnetic tapes, and the like).

Also known, according to European Pat. No. 35,835, are composite films consisting of an unfilled oriented crystalline film and a filled and heat-sealable amorphous film; the thickness of the amorphous layer is lower than that of the median diameter of the filler particles present in this layer.

In sum, it is therefore difficult to conveniently adjust the microroughness of the outer face surface of the film (or of both outer face surfaces), while at the same time eliminating the interfering protuberances.

SUMMARY OF THE INVENTION

Accordingly, a major object of the present invention is the provision of improved biaxially oriented composite polyester films having a surface roughness controllable over varied fields of application and free from protuberances of awkward and undesirable size and consequently having abundantly satifactory properties, for example in respect of machinability and abrasion resistance and well adapted as bases for magnetic tapes having good electromagnetic properties.

Briefly, the present invention features novel biaxially oriented (i.e., drawn or stretched) multi-layer polyester films comprising at least two adjacent layers or laminae, hereinafter designated as (A) and (B), at least one of which defining an outer layer (A) having a surface roughness defined by a plurality of dome and peak protuberances therefrom, the domes being present in a concentration of at least 5 per $mm^2$ and having heights greater than or equal to 9/100 of a micron, a dome being a protuberance such that the ratio of its height to the diameter of its base is less than 1/100, and a peak being a protuberance such that the ratio of its height to the diameter of its base is equal to or greater than 1/100. The base diameter corresponds to the maximum dimension of the particle or protuberance, determined by interferometric microscopic examination.

DETAILED DESCRIPTION OF THE INVENTION

More particularly according to the present invention, the subject films are characterized by a markedly desirable combination of domes and peaks, which cannot be obtained using conventional and other known techniques; it also appears that the majority of the peaks are situated on the domes themselves, resulting in an improvement in slip properties.

The proportion and the relative size of the domes and peaks may be varied in order to adjust the roughnesses. Naturally, the films according to the invention may include on the layer (A), and in any quantity, domes which are less than 9/100 of a micron in height. These domes have no discernible effect on surface roughness.

The height of the peaks and domes may be measured by any interferometry method suitable for this purpose. It is possible, for example, to employ an interferometry method with detection of the phase amplitude. [See, for example, the method described by G. Roblin (*J. Optics* (*Paris*), Vol. 8, No. 5, pages 309–318 (1977))].

Thus, with the aid of interferometry, it is possible to determine the dome heights and to conveniently evaluate the number of domes whose heights are within ranges, the value of which is a fraction of the wavelength employed for measurement. The limits of the ranges, and the extent of the range used for counting may be varied and fixed at will. It is possible, for example, to determine the number of domes per $mm^2$ in ranges of sizes from 9/100 of a micron to 9(n+1)/100 microns, n being an integer equal to or greater than 1 and, in general, less than 10, and preferably less than or equal to 5.

The counting of domes and peaks, between 9/100 of a micron and 45/100 of a micron, and preferably between 9/100 of a micron and 27/100 of a micron is advantageously within the scope of the present invention.

Advantageously, the films according to the invention which simultaneously have domes and peaks of a height greater than or equal to 9/100 of a micron are such that at least 80% of the peaks have a height which is at most equal to twice the height of the domes.

Thus, if in the films of the present invention the domes are of a size which is smaller than or equal to 9 n/100 in microns, n being an integer such as above defined, at least 80% of the peaks will have a height smaller than or equal to 18 n/100 in microns.

Preferably, and consistent with the immediately aforesaid, 80% of the peaks will have a height which is smaller than 9 n/100 in microns, the remainder having a height which is at most equal to 18 n/100 in microns.

The roughness of the films according to the present invention is imparted by the domes and the peaks; it can lie within very wide ranges such that the following inequalities may be satisfied:

$$0.01 \leq R_T \leq 1$$

$$0.001 \leq R_a \leq 0.1$$

The roughness of a film is typically expressed in terms of the following two values:

(i) a value corresponding to the total or maximum roughness $R_T$ (also designated PV corresponding to the term "peak-to-valley") which is defined as the maximum spread of the roughness; and (ii) a value corresponding to the average roughness $R_a$ (also designated CLA according to the term "center line average").

The total or maximum roughness $R_T$ and the average roughness $R_a$ are defined and their measurement is described in the International Standard ISO R 468.

Naturally, the ranges of roughness of the films according to the present invention may be voluntarily fixed within much narrower values, depending upon the intended application therefor.

In the field of films destined for videotape applications, the roughnesses are advantageously within the following limits:

$$0.03 < R_T < 0.3 \quad 0.003 < R_a < 0.03$$

and preferably within the following limits:

$$0.03 < R_T < 0.1 \quad 0.003 < R_a < 0.01$$

In the field of data-recording or audiovisual tapes the roughness is clearly of greater magnitude than in video tapes. This roughness advantageously falls within the following limits:

$$0.02 < R_T < 0.50$$

$$0.02 < R_a < 0.05$$

According to one embodiment of the present invention it is possible to provide on the outer face surface (A) of the films of the present invention a total roughness $R_T$ which is equal to at least 1.3 times, advantageously 1.5 times and preferably twice the total roughness of the full (or monolayer) film obtained using the same polyester composition as that used to produce the layer (A).

The roughness of the layer (A) can therefore be much greater than that of the surface of the full monolayer film. This increase in roughness arises because a roughness transfer connected with the presence, adjacent to the layer (A), of a polyester layer herein designated the layer (B), containing particles of a median volume diameter x. The roughness of the layer (A) which is greater than that of the corresponding full film, may be varied as a function of the thickness of this layer (A) and of the size and quantity of particles present in the layer (B). Without intending to be bound by any particular theory or explanation whatever, it is believed that on the relatively smooth face surface of the layer (A) a roughness is produced by transfer as a result of the presence of distortions existing in the layer (B), in the region of the interface of both layers. This roughness transfer is more pronounced if the size of the particles in the layer (B) increases. The roughness transfer is also a function of the thickness of the layer (A) and it is proportionally more pronounced the more the thickness of the layer (A) is reduced.

The existence of these two adjacent layers (A) and (B) appears, therefore, to be one of the characteristic features of the present invention.

The layer (B) (there may be several layers (B)) therefore incorporates a quantity of an inert particulate material typically comprising from 0.01% to 2% by weight, and preferably from 0.1 to 1% by weight, of the polyester resin of the layer (B), the inert particles having a median volume diameter which is adjusted for the intended application; the median volume diameter advantageously ranges from 0.2 and 2.5 microns.

In the field of films for application in video tapes, the inert particles typically have a median volume diameter of from 0.2 to 1 micron; in audio and data-recording tapes, the median diameter of the particles typically ranges from 0.5 to 2.5 microns and preferably from 0.5 to 1.5 microns.

With reference to such a particle, by "median volume diameter" there is intended the value of the spherical diameter corresponding to 50% of the volume of all of the particles and the value determined from the cumulative distribution curve plotting the volumes of the particles against particle diameter.

By the "spherical diameter" of a particle there is intended the diameter of a sphere whose volume is equal to that of the said particle.

The particles of the layer (B) may be provided by a fine inert filler and/or residues emanating from the catalyst system employed during the interchange reaction and/or polycondensation.

If addition of inert fillers is selected, the fine fillers may then be very varied, and either natural or synthetic in type. Their particle size distribution may be wide or narrow.

The finely divided fillers may be selected from among calcium carbonate, calcined or hydrated aluminum silicate (kaolin, kaolinite, and the like), magnesium silicate, barium sulfate, mica, diatomaceous earth, calcium terephthalate, lithium phosphate, oxides containing a metal or a metalloid of the elements of Groups II, III and IV of the Periodic Table of the elements, for example, aluminum oxide, $TiO_2$, $SiO_2$, MgO, and the like.

Finally, it is also possible within the ambit of the present invention to introduce into the layer (B) two distinct populations of fillers differing from each other in their nature and/or their particle size. (This situation may be encountered when films containing fine fillers are recycled in the layer (B) and those with very fine fillers in the layer (A), as more fully discussed hereinbelow).

When the particles emanate from the catalyst system, the latter may advantageously be a calcium and/or lithium salt. The particles may also comprise organic, optionally polymeric, particles, of an organic or inorganic metal salt or of complex particles having a polyester moiety and a metallic moiety (see, for example, British Pat. No. 1,397,653 and U.S. Pat. No. 4,138,386).

The particle size (median diameter, particle size distribution) of the layer (B), and the relative thickness of the layer (A) are adjusted such as to provide the required roughness. A good roughness transfer, characterized by the presence of domes and peaks, may easily be obtained for a given median volume diameter by reducing the thickness of the layer (A). If x denotes the median volume diameter of the particles of the layer (B), and without intending to be limited thereby, it may be said that a major transfer is produced when the thickness of the layer (A) is equal to at most 6 times the median volume diameter x of the particles in the layer (B). Such a general selection makes it possible to provide an outer face surface roughness which is equal to at least 1.3 times the roughness of the corresponding monolayer film. Roughness transfers will also exist, but in a less pronounced manner, when the thickness of the layer (A) is less than 10 times the median volume diameter of the particles of the layer (B). It should be noted that the layer (B) is a "thick" layer, the thickness of which is equal to at least 3 times the median particle diameter.

The particle size distribution of the particles present in the layer (B) naturally has an influence on the roughness transfer. Advantageously, steps are taken to ensure that this particle size distribution is not too wide. Preferably, this particle size distribution will be narrow. As an example, in video tapes, in the case where a finely divided inert filler is added, the latter may have the following particle size distribution:

| | | |
|---|---|---|
| 2.5 microns > d > 1.5 microns | | 0 to 4% |
| 1.5 microns > d | 0.5 microns | 20 to 40% |
| 0.5 micron > d | | 50 to 80% | with d denoting the particle diameter.

According to a preferred embodiment of the present invention, films of particular interest are prepared by employing in the layer (B) fillers having a median volume diameter x which are such that the thickness t of the layer (A) is related to the median diameter of the particles by the following inequality:

$x/3 \leq e \leq 4x$

The thickness of the layer (A) is advantageously less than about 6 microns.

The polyester resin constituting the layer (A) is a filled resin containing very finely divided particles (average particle diameter below that of the particles of the layer (B).

More particularly, the resin (A) contains very finely divided particles having a median volume diameter y which is clearly smaller than that of the particles of the layer (B) (diameter x) such that the ratio y/x is less than or equal to 0.5 and preferably is less than 0.3. The use of such a resin promotes the production of surface roughness simultaneously incorporating peaks and domes, the size and the number of which are a function of the quantities of particles in both layers, of their average dimensions and the relative thickness of the layer (A) relative to the size of the particles present in the layer (B).

The particles in the layer (A) may emanate from catalyst residues and/or inert fillers introduced into the polyester resin.

When the particles in the layer (A) are the result of adding inert fillers, the quantity of very finely divided filler introduced into the resin (A) is small and typically ranges from 0.01 to 0.5%. The very finely divided filler is selected from among fillers whose chemical nature is similar to that of the filler added to the layer (B) and may be, for example, TiO$_2$ or silica. According to another embodiment of the invention, the finely divided filler and the very finely divided filler may be of the same chemical composition.

The layers (A) containing particles as above defined may comprise two-layer films or films having at least 3 layers, the latter incorporating two outer face surfaces (A).

When the films according to the present invention comprise at least 3 layers, the two outer layers advantageously being layers (A) such as described above, the two roughnesses of the respective outer face surfaces may be the same or different. The films may incorporate one or more core layers which may be filled differently (nature of the particles, size, particle size distribution, and the like).

The films according to the invention which have two asymmetrical outer layers with an original roughness are of particular interest. The presence of a layer with relatively low value of roughness and destined to receive the magnetic material, and of another layer with greater roughness (endowing the film with good machinability characteristics) is especially of interest in the field of magnetic tapes, particularly audio and video tapes.

The films according to the invention may have widely varying thicknesses; the thickness typically ranges from 5 microns to 100 microns and varies in accordance with the intended application thereof. In video applications, the films have a thickness which is generally below 15 microns. In data recording and audiovisual applications the films generally have such dimension which ranges from 4 microns to 12.5 microns.

The films according to the present invention may be produced by any process which enables manufacture of a multilayer film, for example, by coextrusion.

The films according to the present invention may thus be manufactured by coextrusion using a multichannel die or a conventional die preceded by a device in which the various layers are combined into the desired structure.

Advantageously, a multichannel die is employed in which the various streams of molten polymers are delivered to the die by separate channels and are then distributed along the width of the die before being combined at the entry of the die lips to provide the desired complex structure at the outlet thereof.

According to another embodiment of the invention the films are produced by coextrusion of at least two filled polyester resins.

Another object of the invention is a process for preparing biaxially drawn multilayer films comprising at least two adjacent layers or laminae (A) and (B), said outer layer (A) having a surface roughness provided by domes and peaks as above defined and characterized in that at least two polyester resins are coextruded, one destined to form the layer (A) and containing from 0.01 to 0.5% of inert particles of a median volume diameter y, the other destined to form the layer (B) and containing from 0.01 to 2% of inert particles of a median volume diameter x, x ranging from 0.5 to 2.5 microns, the ratio y/x being less than or equal to 0.5, the amorphous film resulting from the coextrusion being biaxially stretched in conventional manner, the die orifice being selected such that after biaxial stretching or drawing the thickness of the layer (A) is less than 10 x and the thickness of the layer (B) is equal to at least 3 times the median diameter of the filler present in this layer.

The polyester resins employed according to the invention are not critical. They may be obtained by any known process from a diol (ethylene glycol, butanediol, and the like) and dicarboxylic acids or a diester of a dicarboxylic acid. They may also comprise a polyester mixture or a copolyester such as those obtained from polyethylene terephthalate by partial replacement of ethylene glycol by other glycols, such as 1,4-butanediol, neopentyl glycol, 1,4-di(hydroxymethyl)cyclohexane, or by partially replacing terephthalic acid by another aliphatic or aromatic dibasic acid, such as adipic acid, sebacic acid or isophthalic acid. The polyester resins are advantageously selected such that, after being drawn and oriented, the film is provided with satisfactory mechanical properties (a film having a high crystalline content).

Preferably, the polyester resins which will form the layers (A) and (B) are based on polyethylene terephthalate. More preferably, the polyester resins are polyethylene terephthalates whose intrinsic viscosity measured in o-chlorophenol at 25° C., at a concentration of 1%, ranges from 0.6 to 0.75 dl/g.

The biaxially drawn films according to the invention are obtained from polyester resins of the type (A) and (B), by receiving, for example, on a cooled rotating drum the coextruded laminate formed by the superposed molten layers of polyester and then subjecting the amorphous laminate to conventional drawing treatments (monoaxial drawing or biaxial drawing in two directions at right angles) and heat-setting.

Naturally, the operating conditions will have to be adjusted such that the original roughness, e.g., as defined above, is imparted to the layer (A). This is readily achieved by controlling the thickness of the layer (A), and the size and the particle size distribution of the particles in the layer (B).

Preferably, the amorphous laminate is subjected to a process of biaxial drawing according to the usual sequence (the first drawing is lengthwise) or a reverse sequence (the first drawing is transverse) with a lengthwise draw ratio ranging from 3 to 5 and a transverse draw also ranging from 3 to 5. The heat-setting treatment is carried out at an increasing temperature in a temperature range of from 150° to 250° C.

The biaxially drawn films obtained according to the present invention are noteworthy in the sense that they are well adapted as base substrates for numerous applications, particularly for producing magnetic tapes for computers or in the video field.

Another object of the present invention, therefore, is the use of the films described above to manufacture magnetic tapes.

Insofar as the video magnetic tape, in particular, is concerned, the composite films of the invention are bases which have a particularly desirable combination of properties: the presence of a relatively smooth face surface with a roughness due to domes and peaks which is suitable for receiving, with good adhesion properties, the magnetic portion (magnetic coating or metallizing) and the existence of a face surface with greater roughness due to peaks, and, if appropriate, domes, thus imparting good machinability thereto.

As hereinbefore mentioned, such films have, on the face surface (A), a roughness which is more coarse than that of a corresponding monolayer film having the same composition; surprisingly, this phenomenon has no effect whatever on electromagnetic properties, while providing much better machinability.

It will also be noted that the thickest layer of the composite polyester film is typically a filled layer. Scraps of the composite film, particularly the edges, may be conveniently recycled to partly re-form the filled layer (B), the structure of this film making it possible to tolerate possible faults produced by the untimely and accidental presence of interfering particles.

In order to further illustrate the present invention and the advantages thereof, the following specific examples are given, it being understood that same are intended only as illustrative and in nowise limitative.

EXAMPLES

Unfilled polyethylene terephthalates and several filled batches of polyethylene terephthalate were successively prepared by transesterification of dimethyl terephthalate. The polyethylene terephthalates polymers were prepared using either calcium acetate or manganese acetate as the interchange catalyst and, in both cases, with antimony as a polycondensation catalyst. The various batches of polymers prepared were as follows:

(I) Unfilled polyester;
(II) Polyester filled with 0.25% by weight of $TiO_2$ (median volume diameter of the particles, 0.4 micron);
(III) Polyester filled with 0.25% by weight of calcium carbonate (median volume diameter of the particles, 1 micron);
(IV) Polyester filled with 0.25% by weight of calcium carbonate (median volume diameter of the particles, 0.4 micron);
(V) Polyester filled with 0.4% by weight of kaolinite (median volume diameter of the particles, 0.3 micron); and
(VI) Polyester filled with 0.4% by weight of kaolinite (median volume diameter of the particles, 1 micron).

The polyesters had an intrinsic viscosity of 0.65 dl/g. The fillers were added in the form of a glycol suspension which was incorporated into the reaction mixture upon completion of the interchange reaction. The polyesters may contain particles emanating from catalyst residues; polyesters containing particles of catalyst residues were employed in Examples 4 and 5 to form the layers (A).

Suitable polymer compositions which were coextruded to obtain the films corresponding to the various examples were prepared from various relative proportions of polymers.

The results are reported in the following Table:

TABLE

| | LAYER (A) | | | | LAYER (B) | | | | ROUGHNESS | | |
|---|---|---|---|---|---|---|---|---|---|---|---|
| | Filler | | | | Filler | | | | | | |
| Ex. | Nature | ∅** | Quantity in ppm | t* | Nature | ∅** | Quantity in ppm | t* | Layer (A) | Layer (B) | DISTRIBUTION OF DOMES AND PEAKS (Layer (A)) |
| 1 | $TiO_2$ | 0.4 | 2500 | 4.5 | kaoli- | 1 | 3000 | 7.5 $R_T$ | 0.155 | 0.28 | 10 domes between 9/100 and 18/100 μm |

TABLE-continued

| | LAYER (A) | | | | LAYER (B) | | | | ROUGHNESS | | |
| | Filler | | | | Filler | | | | | | |
| Ex. | Nature | $\emptyset^{**}$ | Quantity in ppm | $t^*$ | Nature | $\emptyset^{**}$ | Quantity in ppm | $t^*$ | | Layer (A) | Layer (B) | DISTRIBUTION OF DOMES AND PEAKS (Layer (A)) |
|---|---|---|---|---|---|---|---|---|---|---|---|---|
| | 2-layer composite | | | | nite | | | | $R_a$ | 0.015 | 0.025 | 3100 peaks between 9/100 and 18/100 μm<br>800 peaks between 18/100 and 27/100 μm |
| 2 | CaCO₃ | 0.4 | 2500 | 2 | CaCO₃ | 1 | 2500 | 7 | $R_T$ | 0.12 | 0.15 | 12 domes between 9/100 and 18/100 |
| | 2-layer composite | | | | | | | | $R_a$ | 0.01 | 0.015 | 2500 peaks between 9/100 and 18/100<br>700 peaks between 18/100 and 27/100 |
| 3 | TiO₂ | 0.4 | 2500 | 2 | CaCO₃ | 1 | 2500 | 7 | $R_T$ | 0.12 | | 11 domes between 9/100 and 18/100<br>2800 peaks between 9/100 and 18/100 |
| | 3-layer composite<br>2 identical outer layers (A) (namely: filler, quantity, thickness) | | | | | | | | $R_a$ | 0.01 | | 700 peaks between 18/100 and 27/100 |
| 4 | None | | 0 | 2 | kaolinite | 0.3 | 4000 | 7 | $R_T$ | 0.082 | 0.184 | 7 domes/mm² of a height between 9/100 and 18/100 μm |
| | 2-layer composite | | | | | | | | | 0.009 | 0.017 | 41 peaks/mm² of a height between 9/100 and 18/100 μm<br>4 peaks/mm² of a height between 18/100 and 27/100 μm |
| 5 | None | | 0 | 5.5 | kaolinite | 1 | 4000 | 3.5 | | 0.11 | 0.28 | 10 domes/mm² of a height above 9/100 μm |
| | 2-layer composite | | | | | | | | | 0.011 | 0.025 | 31 peaks/mm² of a height between 9/100 and 18/100 μm<br>3 peaks/mm² of a height between 18/100 and 27/100 μm |

*: $t^*$ = thickness in microns
: $\emptyset^{}$ = median diameter in microns While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A biaxially drawn, thin multilayer polyester film substrate, comprising a composite of at least two adjacent layers of biaxially stretched thermoplastic polyester film, said at least two layers being adjoined at an interface, one of said layers having an inner surface at said interface containing a roughness formed by particles having a median volume diameter x, said particles forming peak protuberances and dome protuberances projecting from said inner surface, another of said at least two layers having a thickness less than or equal to 10 times the diameter x such that an outer surface of said other layer opposite said interface has a roughness formed by peak protuberances and dome protuberances which are characterized by the peak protuberances and dome protuberances of said inner surface, said dome protuberances on said outer surface being present in a concentration of at least 5 per mm² and having heights of at least 9/100 of one micron, the ratio of the height of such dome protuberances to the diameter of the base thereof being less than 1/100, and the ratio of the height of said peak protuberances on said outer surface to the diameter of the base thereof being at least 1/100.

2. The polyester film substrate as defined by claim 1, at least 80% of said peak protuberances on said outer surface having heights no greater than twice the heights of said dome protuberances on said outer surface.

3. The polyester film substrate as defined by claim 1, said dome protuberances on said outer surface having heights less than 9 n/100 of one micron, wherein n is an integer of at least 1, and at least 80% of said peak protuberances on said outer surface having heights no greater than 18 n/100 of one micron.

4. The polyester film substrate as defined by claim 3, wherein n is no greater than 10.

5. The polyester film substrate as defined by claim 1, said particles comprising from about 0.01 to 2% by weight of said one layer and having a median volume diameter of from about 0.2 to 2.5 microns.

6. The polyester film substrate as defined by claim 5, said inert particles comprising finely divided filler particulates.

7. The polyester film substrate as defined by claim 6, wherein the thickness of said other layer is less than or equal to 6 times the diameter x.

8. The polyester film substrate as defined by claim 7, wherein the thickness of said other polyester film layer is at least 3 times the diameter x.

9. The polyester film substrate as defined by claim 6, said other layer having particles distributed therethrough, the ratio of the median volume diameter of the particles in said other layer to the median volume diameter of the particles in said one layer being no greater than 0.5.

10. The polyester film substrate as defined by claim 6, comprising a pair of said other layer, and said one layer laminated therebetween.

11. The polyester film substrate as defined by claim 1, the thickness of said other layer being less than 6 microns.

12. The polyester film substrate as defined by claim 1, said outer surface having a maximum roughness, $R_T$, ranging from 0.01 to 1, and an average roughness, $R_a$, ranging from 0.001 to 0.1.

13. The polyester film substrate as defined by claim 1, said outer surface having a maximum roughness, $R_T$, ranging from 0.03 to 0.3, and an average roughness, $R_a$, ranging from 0.003 to 0.3.

14. The polyester film substrate as defined by claim 1, said outer surface having a maximum roughness, $R_T$, ranging from 0.02 to 0.50, and an average roughness, $R_a$, ranging from 0.02 to 0.05.

15. The polyester film substrate as defined by claim 1, said films biaxially stretched to a draw ratio of from about 3 to 5 in both the longitudinal and transverse directions.

16. The polyester film substrate as defined by claim 1, said composite comprising a coextruded laminate.

17. The polyester film substrate as defined by claim 1, having a total thickness no greater than about 100 microns.

18. The polyester film substrate as defined by claim 1, wherein the thickness of said other layer is greater than or equal to ⅓ times the diameter X and less than or equal to 4 times the diameter x.

19. A process for making a thin multi-polyester film substrate comprising the steps of:

coextruding a composite of at least two adjoining polyester film layers, one of said layers containing particles with a median volume diameter x which form peak protuberances and dome protuberances projecting from an inner surface of said one layer, which surface is located at an interface between said layers, biaxially stretching said composite such that the thickness of the other of said films is less than or equal to 10 times the diameter x, whereby an outer surface of said other layer opposite said interface has a roughness formed by peak protuberances and dome protuberances characterized by the peak protuberances and dome protuberances of said inner surface, said dome protuberances on said outer surface being present in a concentration of at least 5 per $mm^2$ and having heights of at least 9/100 of one micron, the ratio of the height of some dome protuberances to the diameter of the base thereof being less than 1/100, and the ratio of the height of said peak protuberances on said outer surface to the diameter of the base thereof being at least 1/100.

* * * * *